(12) United States Patent
Ichikawa

(10) Patent No.: US 7,287,633 B2
(45) Date of Patent: Oct. 30, 2007

(54) SUPPORTING STRUCTURE OF MULTI-PLATE CLUTCH AND METHOD OF ASSEMBLING MULTI-PLATE CLUTCH AND SHAFT WITH PUMP COVER

(75) Inventor: Kiyokazu Ichikawa, Fukuroi (JP)

(73) Assignee: NSK Warner K.K., Tokyo (JP)

( * ) Notice: Subject to any disclaimer, the term of this patent is extended or adjusted under 35 U.S.C. 154(b) by 275 days.

(21) Appl. No.: 11/061,457

(22) Filed: Feb. 22, 2005

(65) Prior Publication Data

US 2005/0183925 A1 Aug. 25, 2005

(30) Foreign Application Priority Data

Feb. 24, 2004 (JP) ............................. 2004-047212

(51) Int. Cl.
*F16H 63/30* (2006.01)
(52) U.S. Cl. .............................. 192/85 AA; 192/110 B
(58) Field of Classification Search ...................... None
See application file for complete search history.

(56) References Cited

U.S. PATENT DOCUMENTS 5,813,508 A * 9/1998 Shoji et al. ............ 192/113.34
6,752,252 B2 * 6/2004 Ichikawa ................ 192/85 AA
7,036,646 B2 * 5/2006 Yabe et al. .............. 192/106 F

FOREIGN PATENT DOCUMENTS

| JP | 2-146343 | 6/1990 |
| JP | 2-103567 | 8/1990 |

\* cited by examiner

*Primary Examiner*—Saul Rodriguez
(74) *Attorney, Agent, or Firm*—Miles & Stockbridge PC

(57) ABSTRACT

A supporting structure of a multiple-plate clutch is constructed by a clutch drum having an outer cylindrical portion in which a spline is formed on an inner periphery, an inner cylindrical portion, and a bottom-wall portion formed at one end of the axial direction, a hub in which a spline is formed on an outer periphery, and a piston for pressing, in the axial direction, a first frictional engaging element which is spline-fitted to the inner periphery of the outer cylindrical portion and a second frictional engaging element which is spline-fitted to the hub. Both sides of the axial direction of a position of a center of gravity of the multiple-plate clutch are bearing-supported.

1 Claim, 2 Drawing Sheets

SUPPORTING STRUCTURE OF MULTI-PLATE CLUTCH AND METHOD OF ASSEMBLING MULTI-PLATE CLUTCH AND SHAFT WITH PUMP COVER

BACKGROUND OF THE INVENTION

1. Field of the Invention

The invention relates to a supporting structure of a multiple-plate clutch which is used for an automatic transmission and a method of assembling the multiple-plate clutch and a shaft with a pump cover.

2. Related Background Art

Generally, according to a multiple-plate clutch which is used for a gearbox of a vehicle, a bearing or a bush for executing a bearing operation in the radial direction is interposed between an inner cylindrical portion of a clutch drum and a shaft, a thrust washer is further interposed between a bottom wall portion of the clutch drum and a partner member, and the clutch is supported to the shaft and the partner member.

For example, Japanese Utility Model Application Laid-Open No. 2-103567 discloses a supporting structure for supporting a drum of a frictional engaging apparatus through a bush and discloses a construction in which the bush is attached to a member which faces an inner cylindrical portion on an outer peripheral side of the inner cylindrical portion of the drum and the inner cylindrical portion is supported by the bush from the outer peripheral side.

Japanese Patent Application Laid-Open No. 2-146343 discloses a supporting structure of a clutch of an automatic transmission in which it has a cylindrical shaft member for supporting a cylindrical portion of an inner cylinder of a clutch drum, the shaft member is further supported to another shaft member, and a fulcrum arranged in an inner peripheral portion of the cylindrical shaft member and a fulcrum for supporting an inner peripheral portion of the inner cylinder of the clutch drum arranged on an outer peripheral side are arranged at a same position in the axial direction.

In Japanese Utility Model Application Laid-Open No. 2-103567 and Japanese Patent Application Laid-Open No. 2-146343 mentioned above, the supporting structure in which the bearing or bush for executing the bearing operation in the radial direction is interposed between the inner cylindrical portion of the clutch drum and the shaft and the thrust washer is interposed between the bottom wall portion of the clutch drum and the partner member is shown as a structure of the multiple-plate clutch.

In consideration of assembling performance, precision of parts, and the like, the multiple-plate clutch is attached in the state where it is movable in the axial direction by a distance of about 2 mm by summing clearances between other parts in a mission casing. Therefore, even with a member such as a thrust washer or the like as mentioned above which is interposed in the axial direction, in the case where a position of the center of gravity in the axial direction of the whole multiple-plate clutch is out of a range in the width direction of the bearing or bush executing the bearing operation in the radial direction, an inclination occurs in the multiple-plate clutch. Such an inclination applies a local load to the bearing or bush executing the bearing operation in the radial direction, so that seizure occurs and a judder or an abnormal sound is caused upon frictional engagement of the multiple-plate clutch.

SUMMARY OF THE INVENTION

It is, therefore, an object of the invention to provide a supporting structure of a multiple-plate clutch in which it is possible to suppress an inclination of the multiple-plate clutch, average a load to a member for executing a bearing operation in the radial direction, and prevent the generation of a judder or abnormal sound upon frictional engagement and to provide a method of assembling the multiple-plate clutch and a shaft with a pump cover.

To accomplish the above object, according to the invention, there is provided a supporting structure of a multiple-plate clutch, comprising: a clutch drum having an outer cylindrical portion and in which a spline is formed on an inner periphery, an inner cylindrical portion, and a bottom wall portion formed at one end of the axial direction; a hub in which a spline is formed on an outer periphery; and a piston for pressing, in the axial direction, a first frictional engaging element which is spline-fitted to the inner periphery of the outer cylindrical portion and a second frictional engaging element which is spline-fitted to the hub, wherein both sides of the axial direction of a position of a center of gravity of the multiple-plate clutch are bearing-supported.

The inclination of the multiple-plate clutch is suppressed, the load which is applied to the bearing member is averaged, and the generation of the judder or the abnormal sound upon frictional engagement is suppressed.

An L-shaped bearing ring provided integratedly with the thrust bearing of the bottom wall portion is used to bearing-support the bottom wall portion.

DETAILED DESCRIPTION OF THE PREFERRED EMBODIMENT

Figure 1:
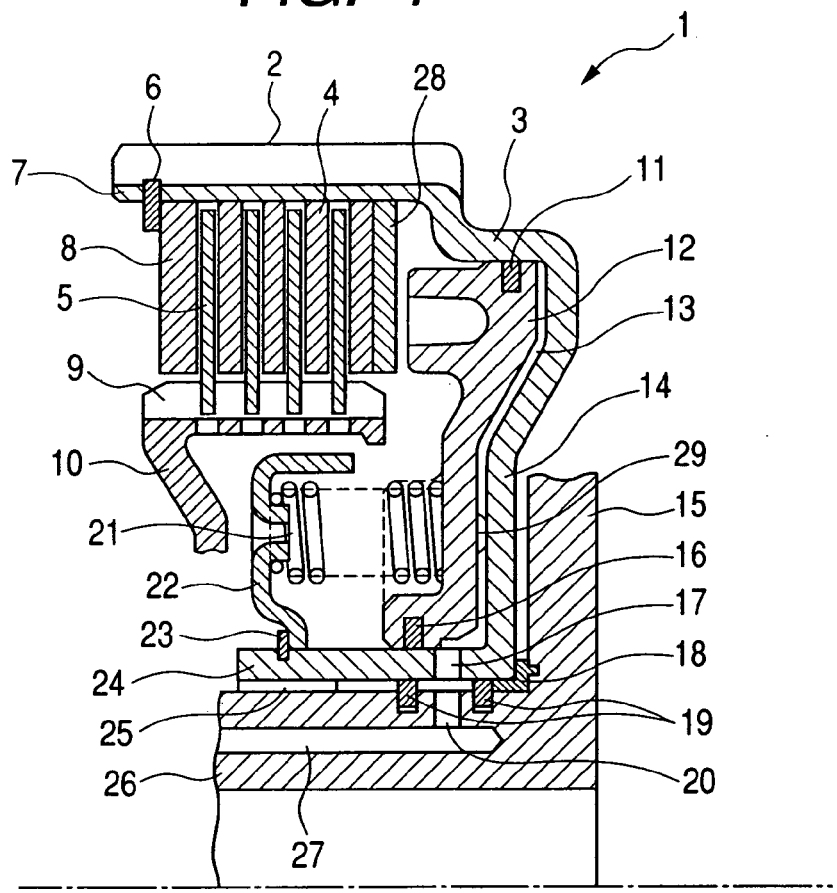
FIG. 1 is a partial cross sectional view in the axial direction showing a whole multiple-plate clutch according to an embodiment of the invention.

An embodiment of the invention will be described in detail hereinbelow with reference to the drawings, in which the same portions are designated by the same reference numerals.

FIG. 1 is a partial cross sectional view in the axial direction showing a whole multiple-plate clutch according to the embodiment of the invention. A multiple-plate clutch 1 comprises: a clutch drum 3 having an outer peripheral cylindrical portion 2 in which a spline 7 is formed on an inner periphery, an inner peripheral cylindrical portion 24, and a bottom wall portion 14 formed at one end of the axial direction between the outer peripheral cylindrical portion 2 and the inner peripheral cylindrical portion 24; a hub 10 in which a spline 9 is formed on an outer periphery; and a piston 12 for pressing, in the axial direction, a first frictional engaging element, that is, a separator plate 4 which is spline-fitted to the inner periphery of the outer peripheral cylindrical portion 2 and a second frictional engaging element, that is, a friction plate 5 which is spline-fitted to the hub 10.

As shown in FIG. 1, the separator plate 4 and the friction plate 5 are alternately arranged in the axial direction. The separator plate 4 and the friction plate 5 are movable in the axial direction through the splines 7 and 9, respectively, and can be come into contact with each other. A backing plate 8 fixed by a snap ring 6 is provided on an open end side of the clutch drum 3. A disc spring 28 is provided on the piston 12 side, thereby applying a predetermined pre-load to the separator plate 4 and the friction plate 5.

The piston 12 provided in the clutch drum 3 is oiltightly held by an O-ring 11 at an outer periphery of the inside of the clutch drum 3. The piston 12 is also oiltightly held by an O-ring 16 on an inner peripheral side in the inner peripheral cylindrical portion 24. Therefore, a sealed oil chamber 13 is defined between the bottom wall portion 14 of the clutch drum 3 and the piston 12. An oil pressure is supplied into the oil chamber 13 through an oil path 27 and oil holes 20 and 17, which will be explained hereinafter, in order to engage the separator plate 4 and the friction plate 5 so as to enable a torque to be transmitted.

A supporting fitting 22 fixed in the axial direction by a snap ring 23 is provided for the inner peripheral cylindrical portion 24. A return spring 21 is suspended between the supporting fitting 22 and the piston 12. Since the return spring 21 permanently presses the piston 12 in the direction of the clutch drum 3, the piston 12 does not press the separator plate 4 and the friction plate 5 while the predetermined oil pressure is not supplied into the oil chamber 13. Therefore, the separator plate 4 and the friction plate 5 are in the non-engaging state.

A stopper projection 29 having a predetermined axial length is formed on the surface of the piston 12 on the clutch drum 3 side. Since the stopper projection 29 is come into contact with the inner wall of the clutch drum 3 when the piston 12 is pressed by the return spring 21, a predetermined space of the oil chamber 13 is maintained.

The multiple-plate clutch 1 is bearing-supported by interposing a bush 25 and an L-shaped washer 18 among the inner peripheral surface of an inner peripheral cylindrical portion 24 of the clutch drum 3, an outer peripheral surface of a shaft 26, and a pump cover 15. At this time, the bush 25 and the L-shaped washer 18 are located at both ends of the axial direction of the inner peripheral cylindrical portion 24.

Both sides of the axial direction of a position of a center of gravity of the multiple-plate clutch 1 can be supported by interposing the bush 25 and the L-shaped washer 18 as mentioned above, so that a stable rotation can be assured. Even when the position of the center of gravity is deviated in the axial direction, since the bush 25 and the L-shaped washer 18 are provided for the shaft 26, an offset load which is applied to the bearing is suppressed.

The oil path 27 extending in the axial direction is provided for the shaft 26. The oil path 27 is connected to a hydraulic supplying source (not shown). The oil hole 20 opening outwardly in the radial direction is provided for the shaft 26. The oil hole 20 faces the oil hole 17 provided so as to penetrate the inner peripheral cylindrical portion 24. Seal rings 19 are interposed on both sides of the axial direction of the oil hole 20 in order to keep the oiltight state.

Since the oil hole 20 is communicated with the oil path 27 provided for the shaft 26, the oil chamber 13, the oil holes 17 and 20, and the oil path 27 are communicated in the oil tight state.

Figure 2:
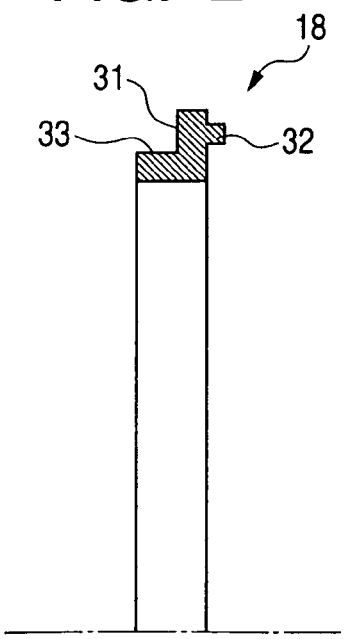
FIG. 2 is a partial cross sectional view in the axial direction showing details of an L-shaped washer which is used in the embodiment of the invention.

FIG. 2 is a partial cross sectional view in the axial direction showing details of the L-shaped washer 18 which is used in the embodiment of the invention. The L-shaped washer 18 is an almost annular member and has an L-shaped cross section of the axial direction.

The L-shaped washer 18 has: a bottom wall portion supporting surface 31 interposed between the bottom wall portion 14 of the clutch drum 3 and a partner member (pump cover 15); and an inner cylindrical portion supporting surface 33 which extends in the axial direction and supports the inner peripheral cylindrical portion 24 interposed between the clutch drum 3 and the shaft 26.

The portions of the bottom wall portion supporting surface 31 and the inner cylindrical portion supporting surface 33 can be also constructed by different members in such a manner that a function of the bottom wall portion supporting surface 31 is provided for the thrust washer and a function of the inner cylindrical portion supporting surface 33 is provided for the bush, respectively. By constructing the integrated L-shaped washer 18 as mentioned above, the number of parts is decreased, assembling performance is improved, and the costs can be reduced.

Further, actually, a straight portion hardly exists between the bottom wall portion 14 and the portion where the seal rings 19 are arranged and the movement of about 2 mm in the axial direction can occur in the multiple-plate clutch 1 as mentioned above, it is difficult to arrange the bush therebetween and perform the bearing operation. However, such a problem can be solved by using the L-shaped washer 18.

A fitting portion 32 projecting in the axial direction is provided for the L-shaped washer 18 on the side opposite to the bottom wall portion supporting surface 31 of the axial direction. The fitting portion 32 is fitted into a concave portion 34 (FIG. 3) formed in the pump cover 15 of the shaft 26.

A needle bearing can be also arranged in place of the bush 25 which is arranged on the front edge side of the inner peripheral cylindrical portion 24. A synthetic resin, a copper alloy (phosphor bronze, brass, or the like), bimetal, aluminum, or the like can be used as a material of the L-shaped washer 18.

Figure 3:
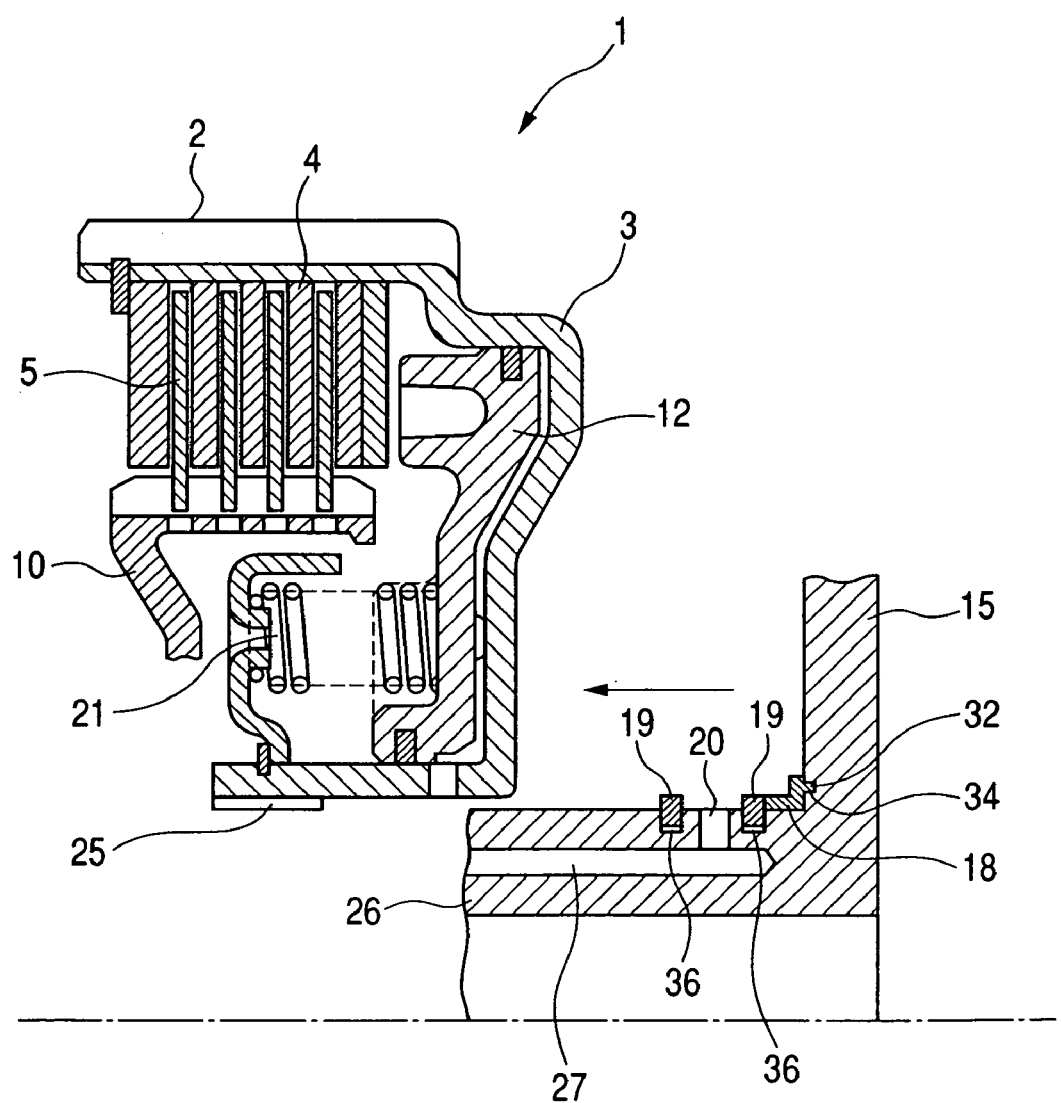
FIG. 3 is a partial cross sectional view in the axial direction showing a method of assembling the multiple-plate clutch and a shaft with a pump cover according to the embodiment.

FIG. 3 is a partial cross sectional view in the axial direction showing a method of assembling the multiple-plate clutch and the shaft with the pump cover according to the embodiment.

The bush 25 as a bearing member is attached to the inner peripheral surface of the inner peripheral cylindrical portion 24 of the clutch drum 3 by inserting it with a pressure. The L-shaped washer 18 and the seal rings 19 are arranged to the shaft 26. The L-shaped washer 18 is attached by fitting the fitting portion 32 formed in the L-shaped washer 18 into the concave portion 34 formed in the pump cover 15.

The seal rings 19 are fitted into concave grooves 36 formed on both sides of the axial direction of the oil hole 20. An arbitrary method can be used as a fitting method of the L-shaped washer 18 and the shaft 26. For example, a shape of each of the fitting portion 32 and the concave portion 34 can be freely set into a circle, a triangle, a quadrangle, or the like. It is also possible to construct in such a manner that a convex portion is formed on the pump cover 15 side, a concave portion is formed in the L-shaped washer 18, and they are fitted to each other or a notch is formed in the L-shaped washer 18, a fitting portion corresponding to such a notch is formed on the pump cover 15 side, and they are fitted to each other.

After completion of the above processing steps, the shaft 26 with the pump cover is moved to the multiple-plate clutch 1 in the direction shown by an arrow and they are assembled.

What is claimed is:

1. A supporting structure of a multiple-plate clutch, comprising:

a clutch drum having an outer cylindrical portion in which a spline is formed on an inner periphery, an inner cylindrical portion, and a bottom wall portion formed at one axial end;

a hub in which a spline is formed on an outer periphery;

a piston for pressing, in the axial direction, a first frictional engaging element which is spline-fitted to the inner periphery of said outer cylindrical portion and a second frictional engaging element which is spline-fitted to said hub, wherein said multiple-plate clutch is bearing-supported at both sides, in the axial direction, of a position of a center of gravity of said multiple-plate clutch, wherein said bearing-supporting is provided at a portion of a front edge side of said of said inner cylindrical portion and at a portion of the bottom wall side of said inner cylindrical portion, and wherein said bearing-supporting at said portion of said bottom wall side is provided integratedly with a thrust bearing for said bottom wall portion.

* * * * *